United States Patent [19]

Takemura

[11] Patent Number: 5,048,025
[45] Date of Patent: Sep. 10, 1991

[54] SUPERCONDUCTING FREE ELECTRON LASER

[75] Inventor: Yasuhiko Takemura, Atsugi, Japan

[73] Assignee: Semiconductor Energy Laboratory Co., Ltd., Atsugi, Japan

[21] Appl. No.: 470,733

[22] Filed: Jan. 26, 1990

Related U.S. Application Data

[63] Continuation-in-part of Ser. No. 287,069, Dec. 21, 1988, Pat. No. 4,971,945.

[30] Foreign Application Priority Data

Dec. 21, 1987 [JP] Japan .................................. 62-321391

[51] Int. Cl.$^5$ ................................................ H01S 3/00
[52] U.S. Cl. ......................................................... 372/2
[58] Field of Search ............................................. 372/2

Primary Examiner—Léon Scott, Jr.
Attorney, Agent, or Firm—Sixbey, Friedman, Leedom & Ferguson

[57] ABSTRACT

An improved free electron laser is described. The laser comprises an accelerator arranged in order to emit an electron beam along a laser emission line and a circuit loop including a curved line which traces a periodic function along a line parallel with said laser emission line in order to produce a periodic magnetic field along said laser emission line. The periodical circuit is made of a superconducting material, so that the periodical length thereof is made as shown as 100 microns without compromising the strength of the magnetic field induced by the circuit. In another embodiment of the invention, a free electron laser is disclosed where an accelerator is arranged to emit an electron beam along a laser emission line and a plurality of coils are arranged alongside and in substantial parallel with the emission line in order that adjacent coils induce magnetic fields in opposite directions. A power source supplies electric energy to the coils and at least one superconductor is arranged along the emission line to be subjected to the magnetic fields induced by said coils. When a plurality of superconductors are provided, each is arranged to be subjected to the magnetic field induced by one of the coils in a one-to-one correspondence.

5 Claims, 4 Drawing Sheets

SUPERCONDUCTING FREE ELECTRON LASER

RELATED APPLICATION

This application is a continuation-in-part of Ser. No. 07/287,069, patented Nov. 20, 1990 U.S. Pat. No. 4,971,945, filed Dec. 21, 1988 and now abandoned.

BACKGROUND OF THE INVENTION

The present invention relates to superconducting free electron laser.

Free electron lasers are promising devices which can produce coherent and directional radiation at variable wavelengths. The free electron laser can emit laser rays by making use of an electron beam passed through a periodical magnetic field (referred to as "wiggler" for short hereinbelow). Electrons running through a wiggler are waved in accordance with the periodical change of the magnetic field in the wiggler and emit laser rays in phase. The radiation successfully emitted from prior art free electron lasers has been only limited to infrared or millimeter wavelength ranges. The wavelength W of laser rays in accordance with the free electron laser is given by $$W \sim W_0/2r$$

where
Wo is the periodical length of the wiggler,
$r = [1-(v/c)^2]^{-\frac{1}{2}}$
v is the speed of electrons and c is the light speed.

In most cases, wigglers are induced by permanent magnetos and therefore the periodical unit length W is limited to the order of several centimeters. Because of this, when emission of a visible light is desired, it is necessary to accelerate electrons at a very high energy as 100 MeV. Such a high energy requires a very large size accelerator which is inconvenient for industrial and R&D use.

The wavelength of laser rays can be made shorter by use of a wiggler having a shorter periodical unit length. However, the shorter the periodic length is, the lower the magnetic field strength and therefore the emission efficient becomes. At the present, only a maximum conversion efficient of 40% has been attained while the existence of laser emission have been confirmed at a shortest wavelength of 0.5 micron.

SUMMARY OF THE INVENTION

It is an object of the present invention to provide a free electron laser capable of emitting radiation at short wavelengths.

In order to accomplish the above and other objects, a coil is fabricated from a superconducting oxide material at a short periodical length, e.g. 100 microns or shorter while the magnetic field strength is maintained at a sufficient level required to produce a usable laser beam.

DETAILED DESCRIPTION OF THE PREFERRED EMBODIMENTS

Figure 1:
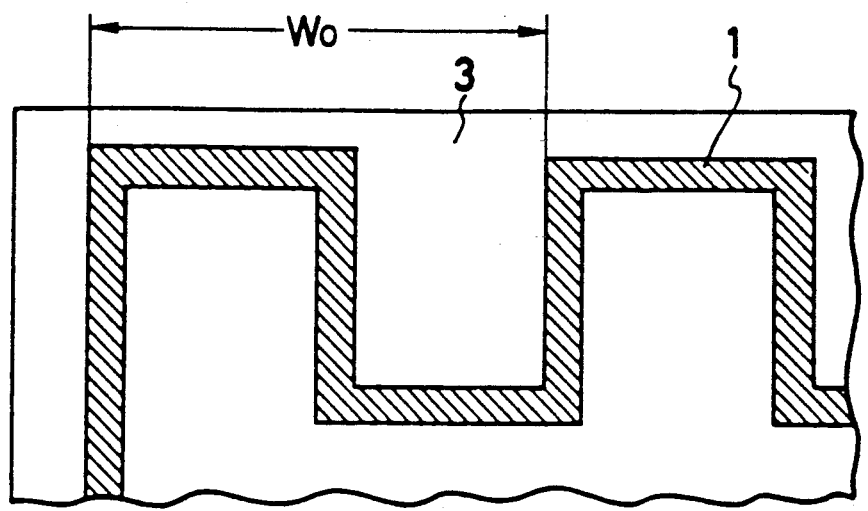
FIG. 1 is a schematic view showing a superconducting coil in accordance with the present invention.

Referring now to FIG. 1, a coil for inducing a wiggler (a periodic magnetic field) is illustrated in accordance with the present invention. The strength B of the magnetic field induced by one turn of the coil as illustrated in FIG. 1 is given by $$B = (\pi \mu_0 I)/a^2$$

where I is the current passing through the coil, a is the radius of the coil, $\mu_0$ is the permeability.

In case of the $Ba_2YCu_3O_7$ type superconducting material, the critical current density Jc not smaller than $10^6$ A/cm$^2$ at 77K can be realized. Accordingly, a superconducting current of 100 A can pass through the coil of the configuration of the above embodiment illustrated in FIG. 1 which induces a magnetic field of about $10^{-2}$ T=100 Gauss at each turn. When electrons are passed between an aligned pair of the coil at 10 MeV which level is available by a relatively small accelerator, the emission wavelength is as short as 1 micron and therefore the visual light emission becomes possible.

Figure 2:
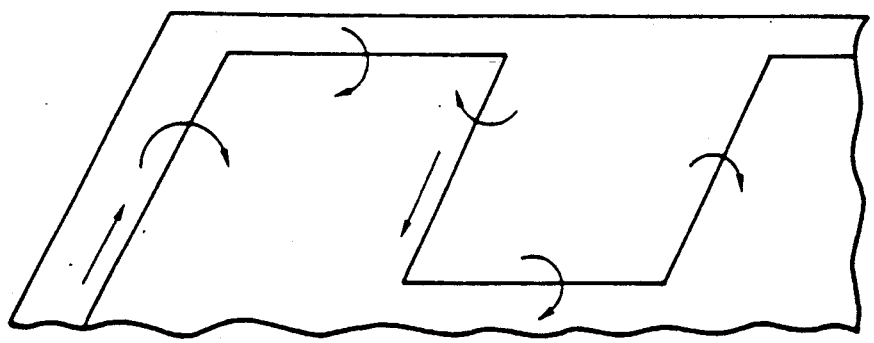
FIG. 2 is an explanatory illustration showing the magnetic field induced by the superconducting coil.
Figure 3:
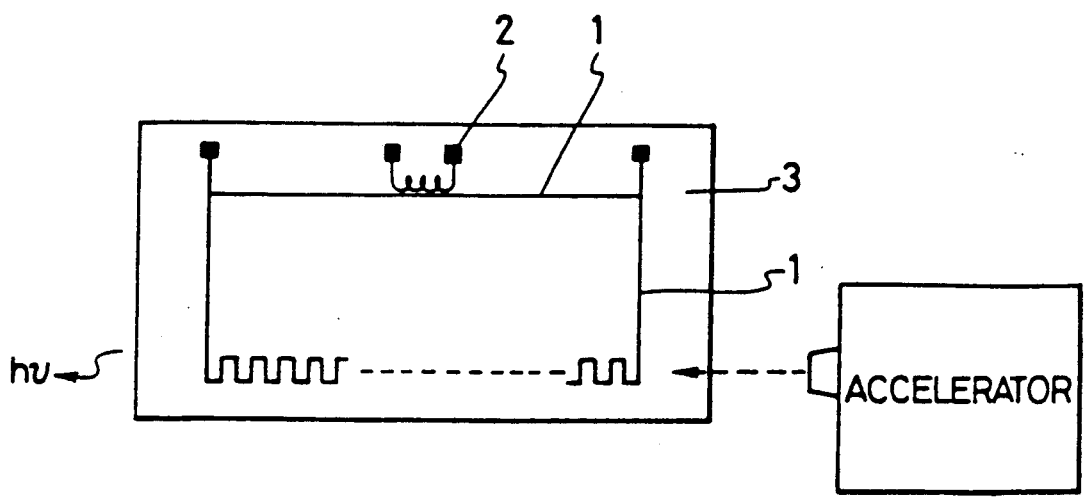
FIG. 3 is a plan view showing a superconducting free electron laser in accordance with the present invention.
Figure 4:
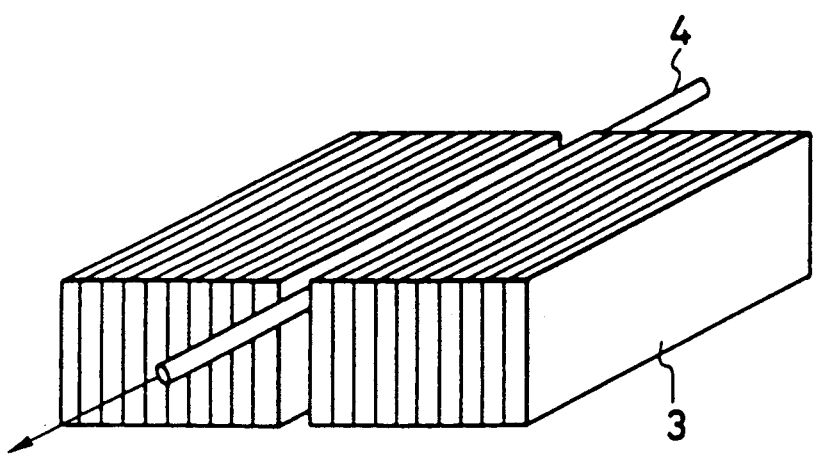
FIG. 4 is a perspective view showing the main portion of a superconducting free electron laser in accordance with the present invention.

The coil is made of a superconducting ceramic of $Ba_2YCu_3O_7$ and formed in the following manner. A ceramic film is deposited on the (100) plane of a single crystalline $SrTiO_3$ substrate of 0.5 mm thickness by a known laser beam evaporation technique using a $Ba_2YCu_3O_7$ ceramic target. The ceramic film is thermal annealed for an hour at 900° C. in an oxygen flow, and gradually cooled. The thickness of the ceramic film is about 100 microns. Then, the ceramic film is subjected to eximer laser scribing in order to produce a pattern 1 including the coil as illustrated in FIG. 1 and FIG. 3. The pattern forms a closed loop 1 from which a pair of input terminals are extended. The square wave form of the coil produces a wiggler (a periodical magnetic field) as schematically illustrated in FIG. 2. Finally, the surface of the structure is covered with a protecting film made of a polymer. A heating coil 2 may be provided for the switching operation of superconducting current. Ten sheets of the coils are laminated in alignment with each other to produce a stronger magnetic field. A vacuum tube 4 is interposed between two laminates of the coils as illustrated in FIG. 4. After the coil assembly is energized and immersed in a nitrogen pool, an electron beam is passed through the vacuum tube 4 which is subjected to a wiggler.

The periodic length Wo, i.e. double the distance between each adjacent vertical lines in the wave form of the coil is 2 mm. The vertical dimension of the coil is Wo/2. The width of the superconducting line constituting the coil is 100 microns. The pattern is produced by projecting the laser beam which is emitted from a KrF eximer laser (248 nm) and focused to a cross section of 300 microns × 300 microns by means of an optical system. The portions of the ceramic film can be removed by irradiating three times with a pulsed laser at 0.2 mJ/cm$^2$. While eximer lasers are suitable for this purpose, having regards to accuracy and speed of machining, other lasers are of course usable, e.g. YAG, CO$_2$ and the like. An equivalent coil can be fabricated by spoiling, instead of removing, the portions of the ceramic film also effecting laser irradiation.

In accordance with experiments, microwaves emission at wavelengths of about 100 microns was observed by making use of the device illustrated in FIG. 4 where a superconducting current of 1 A passes through each coil producing 100 Gauss and an electron beam of 1 MeV emitted from an accelerator travels in the tube.

Superconducting ceramics for use in accordance with the present invention also may be prepared in consistence with the stoichiometric formulae $(A_{1-x}B_x)_yCu_zO_w$, where A is one or more elements of Group IIIa of the Periodic Table, e.g. the rare earth elements, B is one or more elements of Group IIa of the Periodic Table, e.g. alkaline earth elements, and $x=0.1-1$; $y=2.0-4.0$, preferably 2.5-3.5; $z=1.0-4.0$, preferably 1.5-3.5; $w=4.0-10.0$, preferably 6.0-8.0. Also, superconducting ceramics for use in accordance with the present invention may be prepared consistent with the stoichiometric formulae $(A_{1-x}B_x)_yCu_zO_w$, where A is one or more elements of Group Vb of the Periodic Table such as Bi, Sb, and As; B is one or more elements of Group IIa of the Periodic Table, e.g. alkaline earth elements, and $x=0.3-1$; $y=2.0-4.0$, preferably 2.5-3.5; $z=1.0-4.0$, preferably 1.5-3.5; $w=4.0-10.0$, preferably 6.0-8.0. Examples of the latter general formulae are $Bi_4Sr_yCa_3Cu_4O_x$, $Bi_4Sr_yCa_3Cu_4O_x$, $Bi_4Sr_yCa_3Cu_4O_x$, $Bi_4Sr_yCa_3Cu_4O_x$, $Bi_4Sr_yCa_3Cu_4O_x$, $Bi_4Sr_yCa_3Cu_4O_x$ (y is around 1.5).

Figure 5:
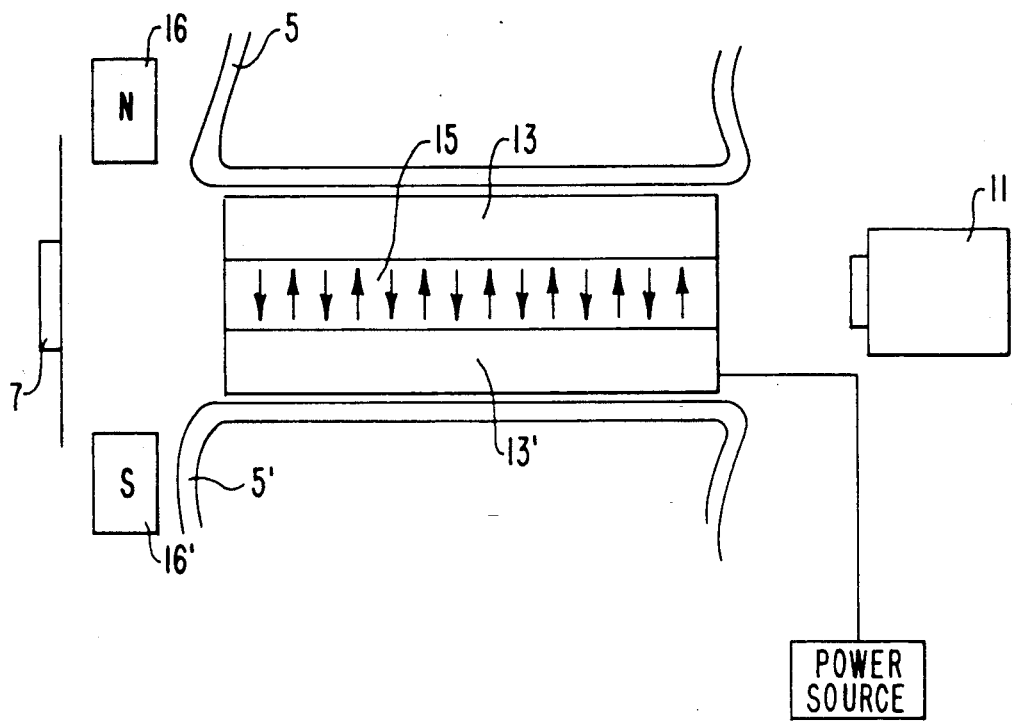
FIG. 5 is a schematic view of a free electron laser in accordance with a further embodiment of the invention.
Figure 7:
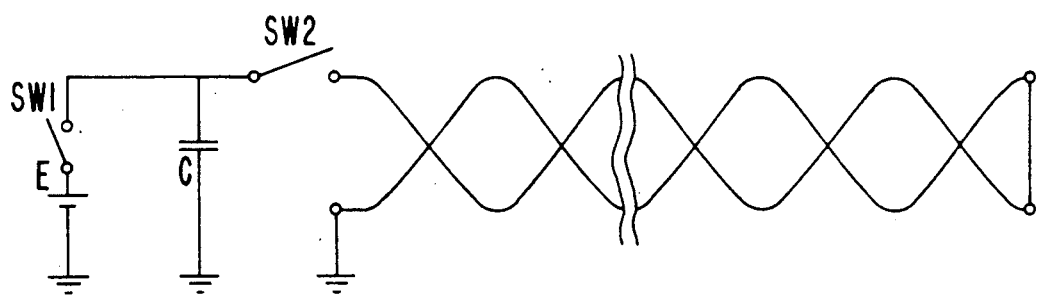
FIG. 7 is a schematic view of an illustrative driving circuit for the wigglers of FIG. 5.

In a further embodiment of the invention illustrated in FIGS. 5-7, a type II superconducting material may be used for a wiggler of a free electron laser of the present invention, examples of such materials being $Bi_2Sr_2Ca_1Cu_2O_{8+x}$ $(0<x<1)$; $Bi_2Sr_2Ca_2Cu_3O_{10+x}$ $(0<x<1)$; $Tl_2Sr_2Ca_1Cu_2O_{8+x}$ $(0<x<1)$; $Tl_2Sr_2Ca_2Cu_3O_{10+x}$ $(0<x<1)$; $Ba_2Sr_2Ca_1Cu_2O_{8+x}$ $(0<x<1)$; $Ba_2Sr_2Ca_2Cu_3O_{10+x}$ $(0<x<1)$; and $Nb_3Sn$.

When type II superconductors are placed in a magnetic field whose strength is larger than the lower critical fields of the type II superconductors, they do not exhibit a complete diamagnetism so that magnetic fluxes penetrate the superconductors. The magnetic fluxes which penetrate the superconductors disappear theoretically when the applied magnetic fields are removed. However, actually, the superconductors are magnetized and keep the magnetic fluxes even after the external magnetic fields are removed because the magnetic fluxes are captured by impurities and small defects of the superconductors. The phenomena that the magnetic fields are captured in the superconductors is called "pinning" and the strength of this phenomena is called "a pinning power". Type II superconductors having a strong pinning power can capture a number of magnetic fluxes in them and create magnetic fields of several teslas.

By utilizing the pinning of the magnetic fluxes, periodical magnetic fields are established for the free electron laser of this embodiment.

Now referring to FIG. 5, this drawing shows a free electron laser of this embodiment which comprises an accelerator 11 to emit an electron beam, a pair of wigglers 13 and 13' between which is a cavity 15 through which the electron beam passes, coolers 5 and 5' to keep the wigglers at a temperature less than the critical temperature of the superconductors, and a window 7 through which radiations emit. The cavity 15 between the wigglers is vacuumed to less than $10-4$ Torr. An electron beam emitted by the accelerator 11 passes between the wigglers 13 and 13' which induce periodical magnetic fields as shown in FIG. 1. Particularly, the directions of the magnetic fields alternates along the emission line of the electron beam. The electron beam is curved by means of a pair of magnets 16 and 16' in order to distinguish the radiation and the electron beam.

Figure 6A:
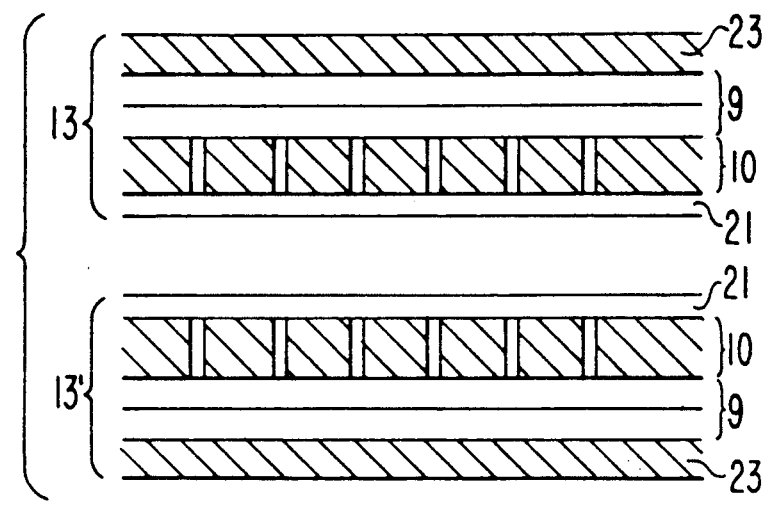
FIG. 6A is a schematic cross-sectional view of illustrative wigglers which may be used in the FIG. 5 embodiment.

A cross sectional view of the wigglers 13 and 13' is illustrated in FIG. 6A. In FIG. 6A, the wiggler comprises a substrate 23 made of an insulating material such as alumina, a plurality of coils 9 formed on the substrate 23 arranged along the emission line in order that each adjacent coil induce a magnetic field having an opposite direction to each other, a plurality of superconductors 10 each of which is arranged to be subjected to the magnetic field induced by one of said coils in a one-to-one correspondence and a protection layer 21 such as alumina to protect the superconductors from being damaged by the electron beam. The superconductors 10 are several microns to 1 millimeters thick and comprise a metal alloy superconductor such as $Nb^2Sn$ or an oxide superconductor such as $YBa^2Cu^3O^{7-x}$ where $0 \leq x \leq 0.5$.

Figure 6B:
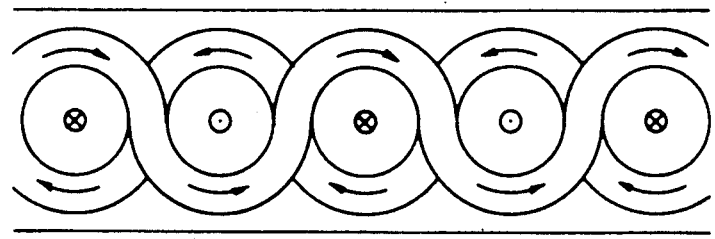
FIG. 6B is a plan view of illustrative coils which may be used in the FIG. 6A embodiment.

Referring to FIG. 6B, this drawing shows a plane view of the coils 9 of FIG. 6A in which two wires form the coils each of which induces a magnetic field opposite to that induced by an adjacent coil by supplying electric currents to the respective wires in opposite directions. The coils may be a superconductor or a normal conductor such as Ag.

Figure 6C:
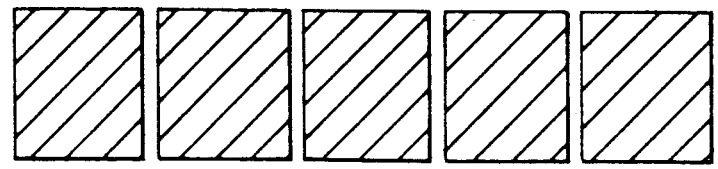
FIG. 6C is a schematic view of the superconductors which may be used in the FIG. 6A embodiment.

Referring to FIG. 6C, this drawing shows the superconductors each of which is divided from the adjacent superconductors in order to keep the magnetic fluxes stable. That is, once magnetic fluxes captured in the superconductors become unstable and begin to move, the magnetic fluxes having the opposite directions offset each other. In order to prevent this damage, the adjacent superconductors are divided from each other.

The length of the wiggler in this embodiment may be from several 10 centimeters to 1 meter. The longer the wiggler is, the larger the amplitude of the laser is.

Next, the operation of the wigglers will be explained referring to FIG. 7 which shows a driving circuit of the wigglers. At first, charges are stored in a capacitor by closing SW1, at this time SW2 is opened. In order to let an electric current flow in the coils, SW1 is opened and SW2 is closed. Then the charges stored in the capacitor are discharged and electric current flows in the coils. The maximum electric current is preferably more than 100 A. As a result, periodical magnetic fields are induced for less than 100 milliseconds by each coil perpendicularly to the surface of the paper as shown in FIG. 6B.

The above periodical magnetic fields penetrate the underlying type II superconductors and are captured there by pinning.

As a result, the periodical magnetic fields are established along the emission line between the pair of wigglers.

When the output of the electron beam by the accelerator was 1 MeV and the periodical length of the magnetic fields of the wigglers was 300 microns, a radiation having a wavelength of 100 microns was observed.

While several embodiments have been specifically described, it is to be appreciated that the present invention is not limited to the particular examples described and that modifications and variations can be made without departure from the scope of the invention as defined by the appended claims. For example, although the example is embodied with the coil configured as shown in FIG. 1, the coil can be formed along a sine curve or other periodic curve drawn about the emission line.

What is claimed is:

1. A free electron laser comprising:
   accelerator means for emitting an electron beam in a predetermined first direction;
   at least one coil disposed adjacent to and substantially in parallel with said first predetermined direction so that, in response to passage of electric current through said coil, each turn of the coil produces a magnetic field which is substantially perpendicular to said first predetermined direction and which is opposite in direction to the direction of the magnetic field produced by an adjacent turn of the coil;
   a power source for supplying said electric current to said coil;
   a plurality of superconductors respectively corresponding to at least some of the turns of the coil and so disposed with respect to said some turns that each superconductor is subjected to the magnetic field of its associated turn of the coil and captures and maintains therein the magnetic field of its associated turn of the coil whereby an electromagnetic wave is generated in response to the electron beam passing through the magnetic fields maintained by said plurality of superconductors.

2. A free electron laser of claim 1 wherein said superconductors are type II superconductors.

3. A free electron laser comprising:
   accelerator means for emitting an electron beam in a predetermined first direction;
   at least one coil disposed adjacent to and substantially in parallel with said first predetermined direction so that, in response to passage of electric current through said coil, each turn of the coil produces a magnetic field which is substantially perpendicular to said first predetermined direction and which is opposite in direction to the direction of the magnetic field produced by an adjacent turn of the coil;
   a power source for supplying said electric current to said coil; and
   a superconductor so disposed with respect to at least some of the turns of the coil that the superconductor is subjected to the magnetic fields of said some turns of the coil and captures and maintains therein the magnetic fields of said some turns of the coil whereby an electromagnetic wave is generated in response to the electron beam passing through the magnetic fields maintained by said superconductor.

4. A free electron laser of claim 3 wherein said superconductor is a type II superconductor.

5. A free electron laser comprising:
   first means for generating a periodic magnetic field where the direction of the magnetic field periodically varies; and
   second means for emitting an electron beam into said periodic magnetic field so that an electromagnetic wave is generated, wherein said first means comprises at least one electromagnetic coil in order to generate said periodic magnetic field and a superconducting layer formed adjacent to said electromagnetic coil so that said magnetic field is captured and maintained in said superconducting layer.

* * * * *